United States Patent
Giesberts et al.

(10) Patent No.: US 8,983,467 B2
(45) Date of Patent: Mar. 17, 2015

(54) METHOD AND APPARATUS FOR ACCESS POINT SELECTION USING CHANNEL CORRELATION IN A WIRELESS COMMUNICATION SYSTEM

(75) Inventors: Pieter-Paul Severin Giesberts, Utrecht (NL); Tim Schenk, Eindhoven (NL)

(73) Assignee: LSI Corporation, Milpitas, CA (US)

( * ) Notice: Subject to any disclaimer, the term of this patent is extended or adjusted under 35 U.S.C. 154(b) by 1217 days.

(21) Appl. No.: 10/949,443

(22) Filed: Sep. 24, 2004

(65) Prior Publication Data

US 2005/0124340 A1    Jun. 9, 2005

Related U.S. Application Data

(60) Provisional application No. 60/528,171, filed on Dec. 9, 2003.

(51) Int. Cl.
*H04W 36/00* (2009.01)
*H04W 48/20* (2009.01)
*H04W 84/12* (2009.01)

(52) U.S. Cl.
CPC .............. *H04W 48/20* (2013.01); *H04W 84/12* (2013.01)
USPC ....................................... 455/436; 455/67.11

(58) Field of Classification Search
CPC .... H04B 7/0617; H04B 7/0626; H04B 7/024; H04W 52/42
USPC ............ 370/331–333; 455/226.1–226.4, 296, 455/67.11–67.14, 442, 432.1, 452.2, 455/436–437

See application file for complete search history.

(56) References Cited

U.S. PATENT DOCUMENTS

| | | | |
|---|---|---|---|
| 6,006,090 A * | 12/1999 | Coleman et al. | 455/432.1 |
| 6,473,467 B1 * | 10/2002 | Wallace et al. | 375/267 |
| 7,088,695 B1 * | 8/2006 | Moon et al. | 370/331 |
| 2003/0157934 A1 * | 8/2003 | Liang | 455/436 |
| 2004/0087308 A1 * | 5/2004 | Tirkkonen et al. | 455/445 |
| 2004/0142693 A1 * | 7/2004 | Feder et al. | 455/443 |
| 2004/0203473 A1 * | 10/2004 | Liu | 455/69 |
| 2004/0213360 A1 * | 10/2004 | McElwain | 375/340 |
| 2005/0059400 A1 * | 3/2005 | Jagadeesan et al. | 455/436 |

FOREIGN PATENT DOCUMENTS

| | | |
|---|---|---|
| JP | 2003-249882 | 9/2003 |
| WO | WO 98/30047 | 7/1998 |
| WO | WO 02/060134 A2 | 8/2002 |
| WO | WO 02/078211 A2 | 10/2002 |
| WO | WO 03/034642 A2 | 4/2003 |
| WO | WO 03/03/094285 | 11/2003 |

OTHER PUBLICATIONS

A. van Zelst, "A Single Coefficient Spatial Correaltion Model for Multiple-Input Multiple-Output (MIMO) Radio Channels", Proc. URSI XXVII General Assembly, Aug. 17-24, 2002, 1-4 (2002).*

* cited by examiner

*Primary Examiner* — Ping Hsieh
(74) *Attorney, Agent, or Firm* — Daniel J. Santos; Smith Risley Tempel Santos LLC

(57) ABSTRACT

A method and apparatus are provided for access point selection in wireless communication systems, such as wireless LANs. A disclosed wireless communication device includes a roaming process that selects an access point based on a measure of correlation on a channel to one or more surrounding access points. The roaming process selects an access point, for example, having the lowest correlation value. The roaming process may also consider the signal quality, channel delay spread or both in selecting an access point.

20 Claims, 6 Drawing Sheets

METHOD AND APPARATUS FOR ACCESS POINT SELECTION USING CHANNEL CORRELATION IN A WIRELESS COMMUNICATION SYSTEM

CROSS-REFERENCE TO RELATED APPLICATIONS

The present application claims priority to U.S. Provisional Patent Application Ser. No. 60/528,171, filed Dec. 9, 2003, incorporated by reference herein.

FIELD OF THE INVENTION

The present invention relates generally to wireless communication systems, such as wireless local area networks (LANs), and more particularly, to data rate control techniques in such wireless communication systems.

BACKGROUND OF THE INVENTION

In a typical wireless network environment, such as a wireless local area network (LAN), a number of wireless stations communicate over one or more wireless channels. An access point typically provides control and management functions. The access point acts as a central node through which all traffic is relayed. Many wireless networks are implemented in accordance with the IEEE 802.11 standard or the various extensions to the 802.11 standard, such as 802.11a, b and g, or the HIPERLAN/2 standard. The IEEE 802.11 protocol specifies that all communications are relayed via the access point, so each transmission that is of interest (other access points may be active on the same radio channel) is from the access point the station is associated with.

Typically, every station, including those that are already associated with an access point, scans the surroundings from time to time in order to find the number of surrounding access points and the quality of the radio link to those access points. The station uses this information to select the access point with the best quality link. If the station is not already connected to the access point with the best link, the station tries to associate with the new access point. In existing systems, the quality of the link is currently based only on the SNR value of the link. A need exists for an improved method and apparatus for selecting an access point in wireless communication systems, such as wireless LANs.

SUMMARY OF THE INVENTION

Generally, a method and apparatus are provided for access point selection in wireless communication systems, such as wireless LANs. A wireless communication device according to the present invention includes a roaming process that selects an access point based on a measure of correlation on a channel to one or more surrounding access points. In one implementation, the roaming process selects an access point having the lowest correlation value. The roaming process may also consider the signal quality, channel delay spread or both in selecting an access point.

A more complete understanding of the present invention, as well as further features and advantages of the present invention, will be obtained by reference to the following detailed description and drawings.

DETAILED DESCRIPTION

Figure 1:
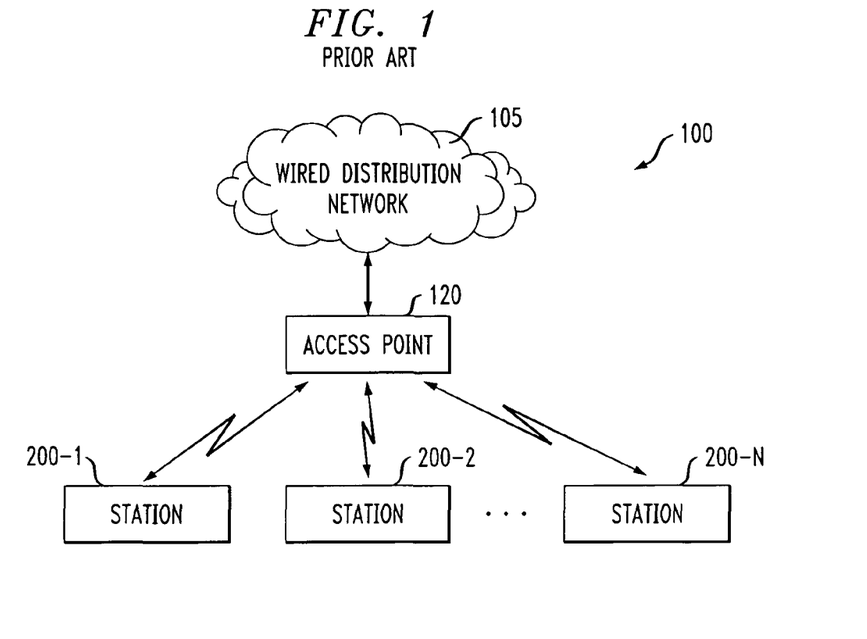
FIG. 1 illustrates a wireless network environment in which the present invention can operate.

FIG. 1 illustrates a wireless network environment 100 in which the present invention can operate. The wireless network environment 100 may be, for example, a wireless LAN or a portion thereof. As shown in FIG. 1, a number of stations 200-1 through 200-N, collectively referred to as stations 200 and discussed below in conjunction with FIG. 2, communicate over one or more wireless channels in the wireless digital communication system 100. An access point 120 is typically connected to a wired distribution network 105 with other access points (not shown). The access point 120 typically provides control and management functions, in a known manner. In addition, the access point 120 acts as a central node through which all traffic is relayed so that the stations 200 can rely on the fact that transmissions will originate from the access point 120. The wireless network environment 100 may be implemented, for example, in accordance with the IEEE 802.11 standard or the various extensions to the 802.11 standard, such as 802.11a, b and g, or the HIPERLAN/2 standard.

The IEEE 802.11 protocol specifies that all communications are relayed via the access point 120, so each transmission that is of interest (other access points 120 may be active on the same radio channel) is from the access point 120 the stations 200 is associated with. An example of such a communications protocol is the Enhanced Service Set (ESS) mode of the IEEE 802.11 protocol, in which stations 200 are associated with an access point 120 that relays all communication.

The access point 120 and wireless stations 200 exchange frames containing information on the transmit power level limits. At the access point 120, the country information is available once the network administrator has configured the access point 120 for country selection. A station 200 receives the information from its access point 120. The frame format for exchanging transmit power level limits is described, for example, in IEEE, "Supplement to Standard for Telecommunications and Information Exchange Between Systems—LAN/MAN Specific Requirements—Part 11: Wireless MAC and PHY Specifications: Spectrum and Transmit Power Management Extensions in the 5 GHz band in Europe," P802.11h/D2.0 (March 2002).

Figure 2:
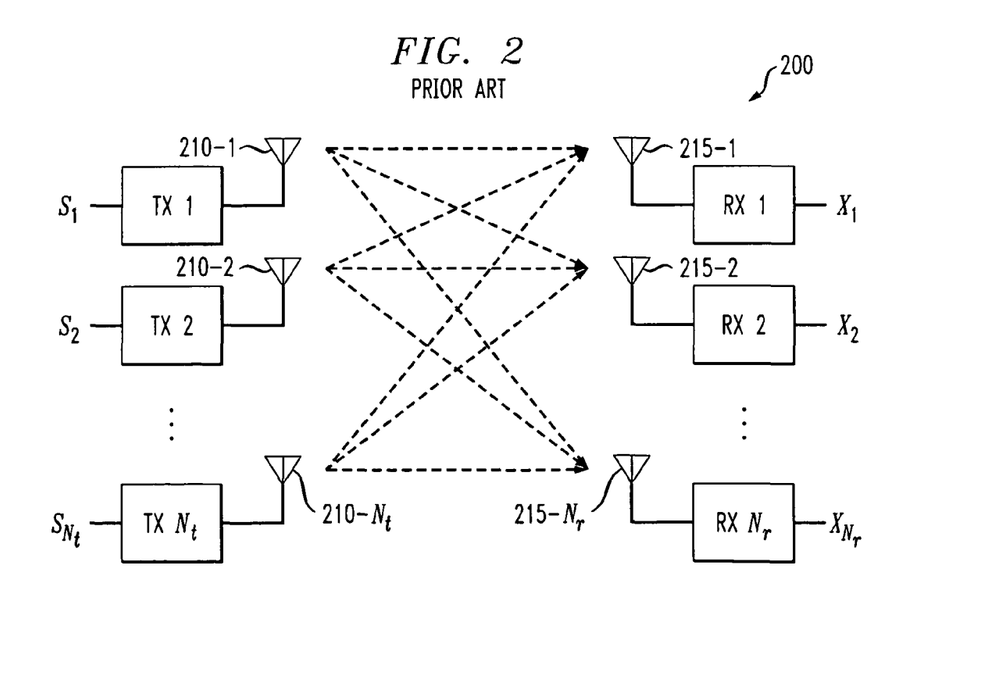
FIG. 2 is a schematic block diagram of an exemplary station of FIG. 1 incorporating features of the present invention.

FIG. 2 illustrates an exemplary conventional MIMO environment in which the present invention can operate. As shown in FIG. 2, an exemplary conventional MIMO system 200 comprises source signals $S_1$ to $S_{N_t}$, transmitters $TX_1$ to $TX_{N_t}$, transmit antennas 210-1 through 210-$N_T$, receive antennas 215-1 through 215-$N_r$, and receivers $RX_1$ to $RX_{N_r}$. The MIMO system 200 transmits separate data streams on the multiple transmit antennas 210, and each receiver RX receives a combination of these data streams.

As used herein, the term "MIMO" shall mean a system in which there are multiple transmission layers, i.e., several distinguishable streams are transmitted from different antennas into the same frequency channel. It is noted that there could be one or more receive antennas in various configurations to receive such a MIMO transmission. In typical implementations for rate enhancement, there will be as many receive antennas as transmit antennas, or more receive antennas than transmit antennas.

The performance of MIMO systems relies on the provided scattering in the wireless channel. When this scattering is poor and the correlation (i.e., spatial channel correlation) between the various channel elements exceeds a predefined threshold, the system is not able to increase the data rate using the multiple antennas. The scattering depends on the surrounding environment of both the transmitter and the receiver (or access point (AP) and station (STA)).

Figure 3:
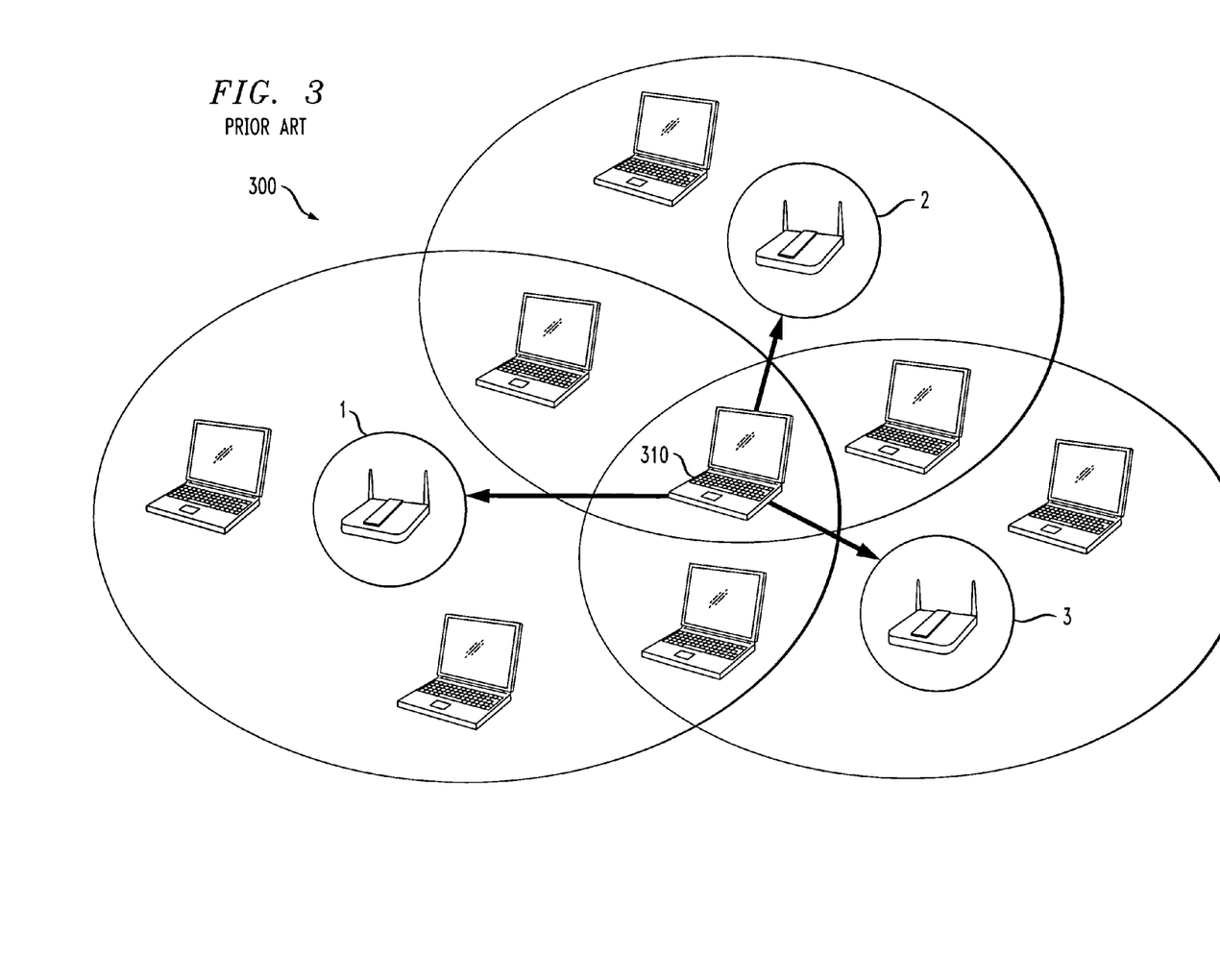
FIG. 3 illustrates a network environment for a wireless LAN system.

FIG. 3 illustrates a network environment for a wireless LAN system 300. As shown in FIG. 3, in a wireless network environment, a station (STA) will generally be able to connect to one or more Access Points (APs). The number of available access points will only increase as network deployment becomes more dense in the future. While the channel elements (H) between one access point and one station might be highly correlated, the channel elements between that same station and another access point might show better correlation properties. When the station can select a connection with the second access point, the possibility of a successful (high rate) transmission will be higher. For example, as shown in FIG. 3, the station 310 can have a connection with access points AP1, AP2 or AP3.

According to one aspect of the invention, a roaming process 700, discussed below in conjunction with FIG. 7, selects an access point for a given station using correlation information.

Correlation Principles

As previously indicated, the roaming process 700 selects an access point based on the correlation between the station and an access point. One measure for the correlation is the set of eigenvalues corresponding to the MIMO channel, which can be estimated from the channel response. In addition, the performance of a MIMO link also relies heavily on the signal-to-noise-ratio (SNR) or channel delay spread. The SNR can be estimated from the preamble of the packet or from previously received packets. This estimation of the MIMO channel is in all cases necessary to do successful recovery of transmitted data. Another measure for the quality of a link is the percentage of packets that are transmitted and received by their destinations with or without errors, which can, for example, be determined from the number of missed or received acknowledgements, respectively. The present invention allows a roaming station to select a new access point using correlation information.

Figure 4:
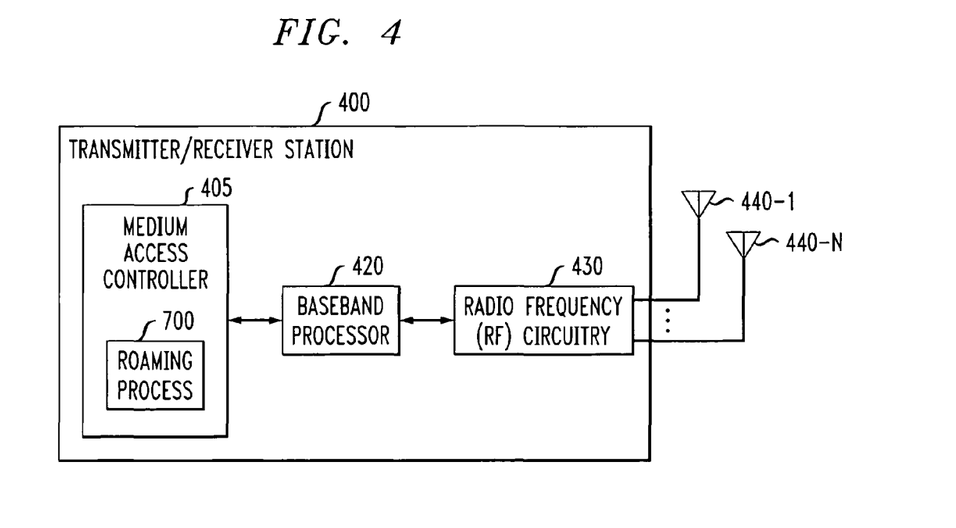
FIG. 4 is a schematic block diagram of an exemplary transmitter/receiver station incorporating features of the present invention.

FIG. 4 is a schematic block diagram of an exemplary transmitter/receiver station 400 incorporating features of the present invention. The stations 400 may each be embodied, for example, as personal computer devices, or any device having a wireless communication capability, such as a cellular telephone, personal digital assistant or pager, as modified herein to provide the features and functions of the present invention.

As shown in FIG. 4, an exemplary station 400 includes a roaming process 700, discussed further below in conjunction with FIG. 7. In addition, a transmitter/receiver 400 includes a Medium Access Controller (MAC) 405 that controls the transmission of data. In the exemplary embodiment, the MAC 405 includes the roaming process 700. In an alternate implementation, the roaming process 700 can be implemented by a separate device that interacts with the MAC 405. Generally, the roaming process 700 selects an access point to be used by the station 400. The baseband processor 420 provides the signal to the RF circuitry 430, which in turn, provides the signal to one or more antennas 440-1 through 440-N, in a known manner.

Figure 5:
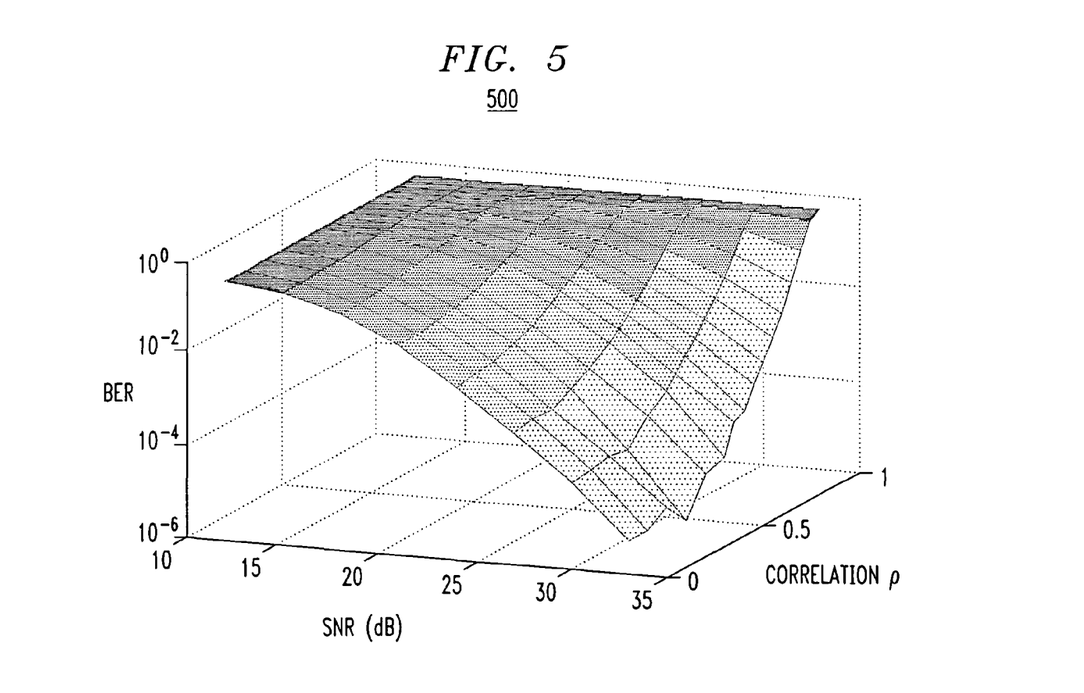
FIG. 5 illustrates the influence of signal-to-noise ratio (SNR) and channel correlation on the performance of a MIMO based OFDM wireless device.

FIG. 5 illustrates the influence of the SNR and channel correlation on the performance of a MIMO based OFDM wireless device. FIG. 5 illustrates the bit-error-rate (BER) performance 500 of a two transmitter and two receiver (2×2) extension of an IEEE 802.11a system. The exemplary system uses 64 QAM modulation, a coding rate of 0.75, yielding a data rate of 108 (2×54) Mbps. The correlation in the MIMO channel is modeled as described in A. van Zelst and J. S. Hammerschmidt, "A Single Coefficient Spatial Correlation Model for Multiple-Input Multiple-Output (MIMO) Radio Channels," Proc. URSI XXVII General Assembly, 17-24 Aug. 2002, 1-4 (2002).

Here, $\rho$ is the parameter modeling the correlation, varying from 0 to 1. In particular, $\rho$ equal to 0 corresponds to fully uncorrelated while $\rho$ equal to 1 corresponds to fully correlated. A Rayleigh faded exponentional decaying power-delay-profile is applied. Generally, as shown in FIG. 5, the performance increases (i.e., the BER decreases) when the SNR increases and the performance decreases when the correlation factor increases.

Figure 6:
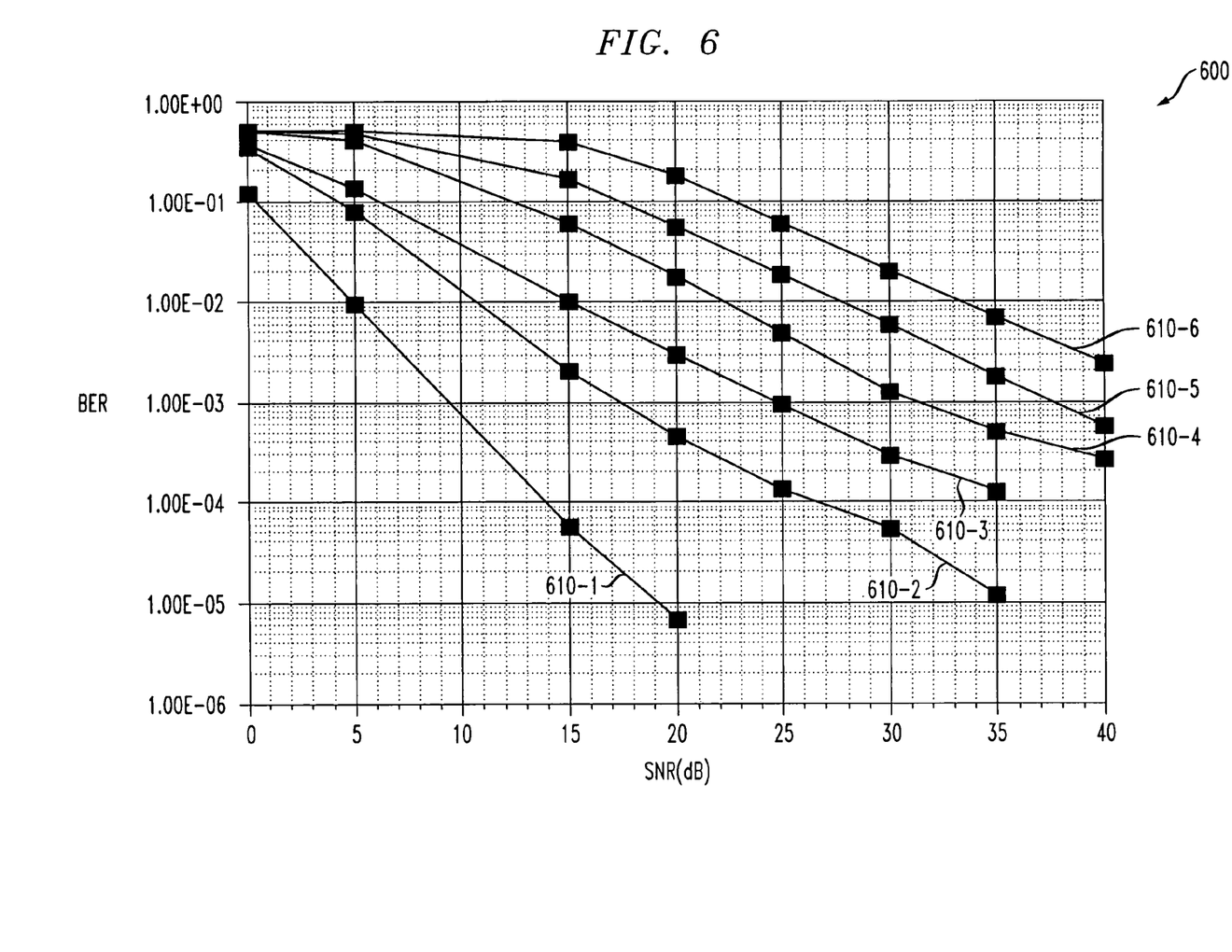
FIG. 6 illustrates bit error rate performance as function of SNR for an exemplary two transmitter and two receiver (2×2) configuration with a correlation, ρ, equal to 0.

FIG. 6 illustrates the BER performance 600 as function of the SNR for a two transmitter and two receiver (2×2) configuration with a correlation, $\rho$, equal to 0. The different data rates 610-1 through 610-6 correspond to rates of 12, 24, 48, 72, 108 Mbps, respectively. The different rates 610-1 through 610-6 are achieved by varying the coding rate and modulation (as also done in 802.11a/g). As shown in FIG. 6, the BER performance is a function of the SNR and data rate. If the receiver is operating at a certain SNR, the data rate can be chosen which achieves the required BER performance. FIG. 6 demonstrates the influence of the modulation and coding rate on the BER performance and SNR requirements.

Illustrative Performance Parameter Estimation

Signal-to-Noise-Ratio (SNR)

The SNR of the wireless channels with the other terminals can be estimated by using the preamble of received packets. This can be done using the Long Training (LT) symbols in the preamble of any received packet. The long training symbols, for example, as proposed in IEEE Std 802.11a, High-speed Physical Layer in the 5 GHz Band (1999), are a repetition of a symbol and a cyclic prefix. After synchronization, the only difference between the two versions of the training symbols is the noise. Thus, subtracting the two symbols gives an estimate of the noise.

Another, more accurate way, to measure the SNR is using the detected data in the packet(s). From constellation points estimates, using, for example, a Least Squares estimation, the detected constellation points after slicing are subtracted. The result is the error in the estimation, of which the statistics relate to the ratio between the signal and noise level. Another technique for measuring the SNR is to measure the received energy level during packet reception (signal level) and during idle periods on the channel (noise level). A number for the SNR is achieved by subtracting the two values.

These parameters or a running average over several packets can be stored in a table, to be used in the enhanced roaming and connection control algorithms, as discussed further below.

Channel Correlation

The channel correlation, or MIMO correlation, can be estimated from the MIMO channel matrix H. Estimates of the channel are in all cases necessary for systems using coherent detection. There are several proposed measures for this correlation, such as effective degrees of freedom (EDOF) and effective dimensions (ED). These measures are all used to determine how many independent streams of data can be transmitted over the channel.

The present invention proposes to calculate the eigenvalues (EVs) or Singular Values (SV) of the channel matrix. This can be calculated using a singular value decomposition (SVD). In a fully uncorrelated MIMO channel, these EVs all will have the same value and will be high. In a correlated channel, some EVs will be lower. A good measure for the correlation is thus the maximum value of EVs and the ratio between them.

Balance Between the Number of Received and Missed ACKs

The balance between the number of received and missed ACKs can also be calculated. This measure stores the number of received and missed acknowledgements. The number of packets that are used to compute this statistic can be based on all ACKs related to packets transmitted at a given data rate, or the last X packets at a given data rate.

Roaming Process Based on Channel Correlation

In current non-MIMO systems, every station, including those that are associated to an access point, scans the surroundings from time to time in order to find the number of surrounding access points and the quality of the radio link to those access points. The station uses this information to select the access point with the best quality link, in a known manner. Then, if the station is not already connected to the access point with the best link, the station tries to associate with the new access point. In existing systems, the quality of the link is currently based only on the SNR value of the link.

The present invention recognizes that for MIMO systems, the roaming and connection control algorithms can be improved, so that they not only use the SNR but also the channel correlation of the links to select the access point with the best link. In other words, the station tries to associate with the access point with the best combination of SNR and channel correlation. As discussed below in conjunction with FIG. 7, the active scanning protocol is enhanced to determine the correlation of the link to other access points than the access point a station is currently associated with.

Figure 7:
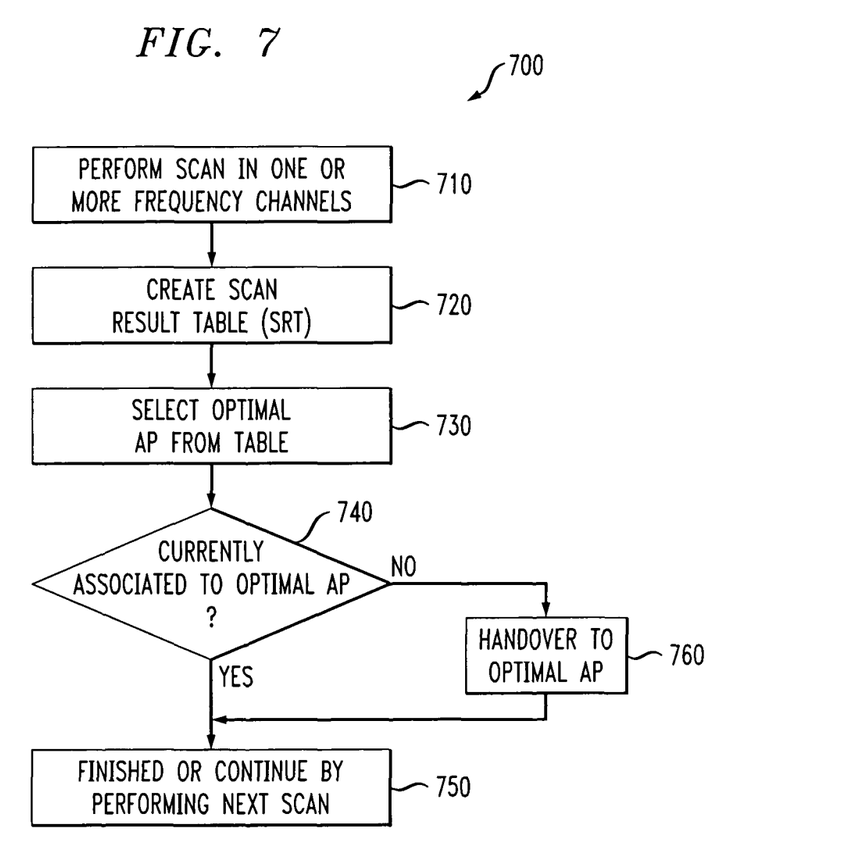
FIG. 7 is a flow chart describing an exemplary roaming process of FIG. 4 incorporating features of the present invention.

FIG. 7 is a flow chart describing an exemplary implementation of a roaming process 700 incorporating features of the present invention. The roaming process 700 of FIG. 7 may run continuously or may be triggered by one or more events, such as a lost connection, a poor SNR to the current access point or a high correlation to the current access point. Once the roaming process 700 is initiated, a scan is performed during step 710 in one or more frequency channels, as discussed further below in conjunction with FIG. 8. During the scanning process, the station collects information about the various access points that it detects. Thereafter, a scan result table (SRT) is created during step 720 to store the information obtained during the scan. The scan result table may contain, for example, for each access point, the operating channel, BSSID, AP capabilities, SNR value and network load in the cell. According to one aspect of the invention, the station also stores the value of the correlation factor in an additional column in the scan result table. The station should also store the number of antennas the AP supports.

The roaming process will then select an access point from the scan result table during step 730 that allows the best possible performance. The selection criteria may be based, for example, on the experienced SNR, the network load of the various APs and certain capabilities of the AP (e.g., whether legacy stations are allowed to associate). The present invention adds the correlation factor and the maximum number of antennas to the selection process. As such, the station will try to connect to the AP with the highest possibility of good-quality MIMO communication.

A test is performed during step 740 to determine if the station is already connected to the optimal access point. If the station is not already connected to the optional access point, the roaming process 700 will hand over the station to the optimal access point during step 760. If it is already connected to the optimal AP, the roaming process (or the current iteration of the process) is terminated during step 750.

Figure 8:
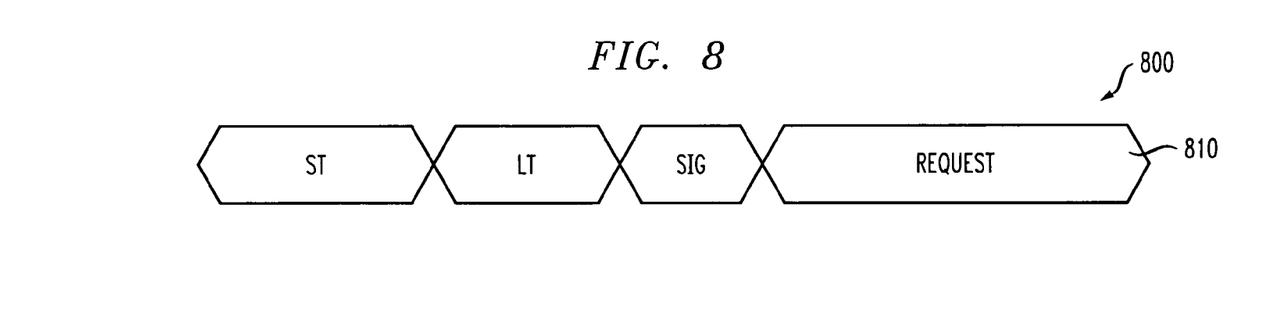
FIG. 8 illustrates a frame format employed by the roaming process of FIG. 7 to transmit probe requests.

FIG. 8 illustrates an exemplary frame format 800 employed by the roaming process 700 to transmit probe requests to the access points. Since MIMO stations and access points will work in an environment that also contains legacy stations (for example, based on either IEEE 802.11a or IEEE 802.11g), it is important that the access point and station (in BSS mode) communicate whether they are MIMO enabled. In an exemplary IEEE 802.11 implementation, the short training (ST) symbol contains 160 samples and is repeated ten times; the long training (LT) symbol contains 160 samples and is repeated 2.5 times; and the signal field (SIG) contains 80 samples. In current networks, access points and stations already communicate the supported data rates during the active scanning process. The present invention proposes to extend this part of the MAC protocol so that it enables MIMO-capable terminals to estimate a measure for spatial channel correlation.

In current systems, the station periodically broadcasts a probe request frame 800 on a specific channel, as shown in FIG. 8. In this probe request, the station reports the Service Set IDentifier (SSID, the network identifier) it wants to connect to and the set of supported data rates, i.e., the rates at which the station can transmit and receive. Subsequently, access points that receive the request and that serve the specified SSID, reply with a probe response (shown in FIG. 9) in which the access point reports the supported data rates.

In the proposed MIMO network, the probing mechanism needs to be enhanced. The probe request frame 810 should include a field that identifies the MIMO modes that the station supports, e.g., the number of transmit and receive antennas with an independent receive path. The frame can either be sent on a MIMO data rate with high range (robustness) or on a legacy non-MIMO data rate. The prior option may have an improved range-performance compared to the legacy rate, but the latter has the benefit that legacy APs will respond as well. It is noted that the MIMO mode and/or data rate should be mandatory for the applicable standard, to assure that all APs that support the standard can receive and decode the frame.

Figure 9:
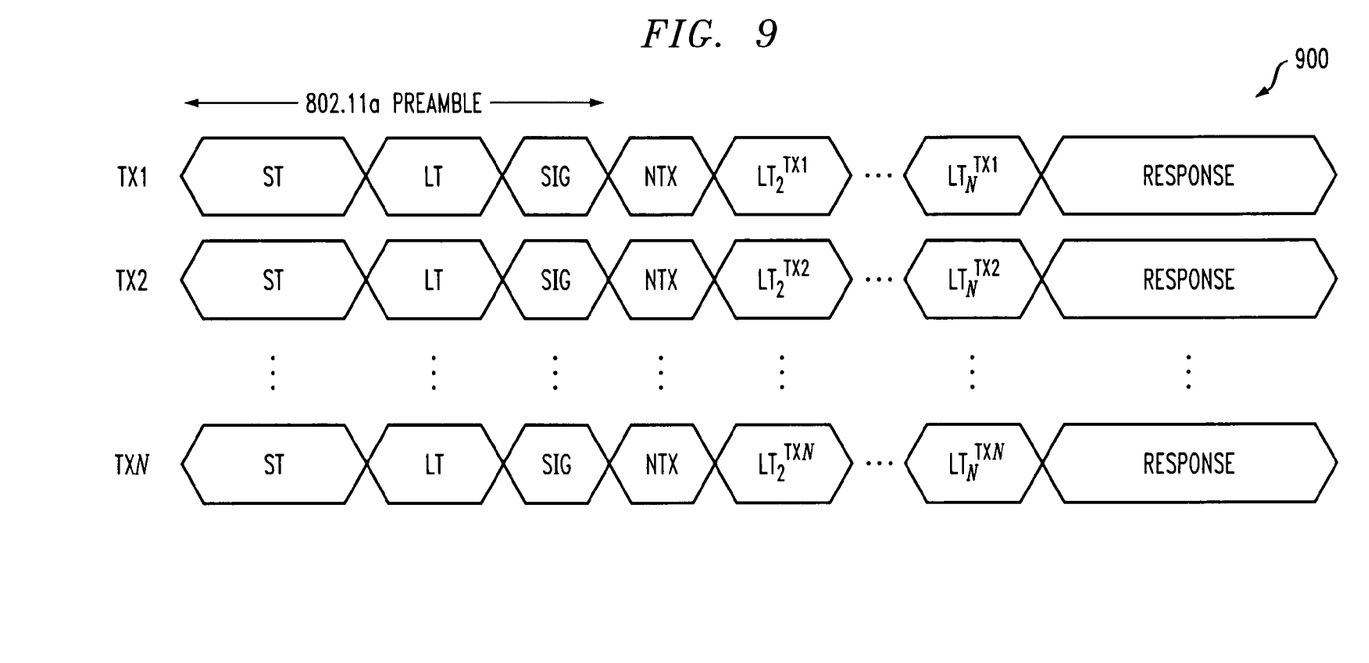
FIG. 9 illustrates a frame format employed by the access points to transmit probe responses.

FIG. 9 illustrates an exemplary frame format 900 employed by the access points to transmit probe responses. The probe response frames are directed at the transmitter of the request frame. The first part of the preamble consists of the 802.11a/g preamble, which enables legacy terminals to back off for the length of the transmission. Thereafter, an extra signal field and the maximum number of training symbols (corresponding to the maximum number of transmitter antennas of the access point) is transmitted, followed by the information about the access point, e.g., fields of the response frame, transmitted in either a legacy or MIMO mode that is optimized for range and not for throughput. In either case, the access point should send training symbols on all of its antennas, so that the receiver can calculate the correlation.

It is to be understood that the embodiments and variations shown and described herein are merely illustrative of the principles of this invention and that various modifications may be implemented by those skilled in the art without departing from the scope and spirit of the invention.

We claim:

1. A wireless communication device, comprising:
   a correlator that obtains a measure of correlation on a channel;
   a controller that implements a roaming process that selects an access point based on said measure of correlation on said channel to one or more surrounding access points, wherein said roaming process selects an access point based on a balance of missed and received acknowledgement messages and a lowest correlation value and wherein said measure of correlation on said channel is measured using a ratio of one or more eigenvalues of a channel matrix calculated using a singular value decomposition and singular values of a channel matrix.

2. The wireless communication device of claim 1, wherein said roaming process further selects said access point based on current link information.

3. The wireless communication device of claim 2, wherein said current link information includes one or more of a signal to noise ratio and channel delay spread.

4. The wireless communication device of claim 1, wherein said roaming process is initiated based on a high correlation to a current access point.

5. The wireless communication device of claim 1, wherein said device is implemented in accordance with the IEEE 802.11 Standard.

6. The wireless communication device of claim 1, wherein said device is implemented in accordance with the HIPERLAN/2 Standard.

7. The wireless communication device of claim 1, further comprising a table that stores an operating channel, identifier, and capabilities for each access point.

8. The wireless communication device of claim 1, further comprising a table that stores a correlation factor for each access point.

9. The wireless communication device of claim 1, further comprising a table that stores a measure of network load in the cell for each access point.

10. A method for selecting an access point in a wireless communication network, comprising the steps of:
    identifying one or more surrounding access points;
    evaluating a channel to each of said one or more surrounding access points; and
    selecting an access point based on a measure of correlation on each of said channels to each of said one or more surrounding access points, wherein said selecting is based on a balance of missed and received acknowledgement messages and a lowest correlation value measured using a ratio of one or more eigenvalues of a channel matrix calculated using a singular value decomposition and singular values of a channel matrix.

11. The method of claim 10, wherein said selecting step further selects said access point based on current link information.

12. The method of claim 11, wherein said current link information includes one or more of a signal to noise ratio and channel delay spread.

13. The method of claim 10, wherein said selecting step is initiated based on a high correlation to a current access point.

14. The method of claim 10, further comprising the step of accessing a table that stores an operating channel, identifier and capabilities for each access point.

15. The method of claim 10, further comprising the step of accessing a table that stores a correlation factor for each access point.

16. The method of claim 10, further comprising the step of accessing a table that stores a measure of network load in the cell for each access point.

17. A wireless communication device, comprising:
    means for obtaining a measure of correlation on a channel;
    means for selecting an access point based on said measure of correlation on said channel to one or more surrounding access points, wherein said means for selecting is based on a balance of missed and received acknowledgement messages and a lowest correlation value measured using a ratio of one or more eigenvalues of a channel matrix calculated using a singular value decomposition and singular values of a channel matrix.

18. The wireless communication device of claim 17, further comprising means for selecting an access point based on current link information.

19. The wireless communication device of claim 18, wherein said current link information includes one or more of a signal to noise ratio and channel delay spread.

20. The wireless communication device of claim 17, further comprising a table that stores a measure of network load in the cell for each access point.

* * * * *